United States Patent [19]

Schaedler et al.

[11] 3,970,110
[45] July 20, 1976

[54] SAFETY INLET AIR VALVE CONTROL ARRANGEMENT FOR AIR POWERED HAND HELD TOOL

[75] Inventors: Raymond J. Schaedler, New Hartford; Livio F. Marcantonio, Utica, both of N.Y.

[73] Assignee: Chicago Pneumatic Tool Company, New York, N.Y.

[22] Filed: Feb. 6, 1975

[21] Appl. No.: 547,473

[52] U.S. Cl. .................. 137/613; 173/169; 137/614.19; 137/637.2
[51] Int. Cl.² .................................. F16K 11/10
[58] Field of Search .......... 91/424; 137/637.2, 613, 137/614.18, 614.19; 173/169

[56] References Cited
UNITED STATES PATENTS

| | | | |
|---|---|---|---|
| 710,508 | 10/1902 | Ott | 137/613 |
| 979,024 | 12/1910 | Moore | 137/637.2 |
| 1,068,605 | 7/1913 | Robertson | 173/169 |
| 1,417,136 | 5/1922 | Burkel | 173/169 |
| 2,362,608 | 11/1944 | Allen | 173/169 |
| 2,612,141 | 9/1952 | Freedman et al. | 137/637.2 |
| 2,796,888 | 6/1957 | Pape et al. | 137/637.2 |
| 2,939,675 | 6/1960 | Warden | 173/169 |

Primary Examiner—William R. Cline
Assistant Examiner—H. Jay Spiegel
Attorney, Agent, or Firm—Stephen J. Rudy

[57] ABSTRACT

Safety air valve control arrangement for feeding inlet air to the motor of a rotary hand held tool, such as an impact wrench, and guarding against accidental feeding of such air, as when the tool is carelessly rested or dropped, the control arrangement comprising a manipulative lever operated throttle valve and a manipulative trigger operable safety valve both of which must be separately manually operated and held at the same time in operated condition to enable inlet air feed to the motor. Release of either valve to closed condition will shut off operation of the tool.

20 Claims, 2 Drawing Figures

SAFETY INLET AIR VALVE CONTROL ARRANGEMENT FOR AIR POWERED HAND HELD TOOL

BACKGROUND OF THE INVENTION

This invention relates to valve structures controlling flow of inlet air to a portable air powered hand held tool of a type having an outside projecting throttle valve lever controlling operation of the tool; and it is more particularly concerned with a safety air feed control valve structure or arrangement for such tools.

Portable pneumatic tools having a conventional air feed control valve structure operable by an outside projecting throttle lever are adapted to be accidentally operated under various conditions, such as when dropped, or carelessly rested with the throttle lever pressed against a bench or wall.

The general objective of the present invention is to provide an improved air feed control valve structure for such tools which avoids the possibility of being accidentally operated.

A feature of the invention lies in the association of a pair of valves controlling inlet air feed, each of which is individually manually operable by means of a separate lever, and both of which must be operated in order to activate the tool. Both valves are spring restorable. Accordingly, both control levers must be manually held operated to maintain operation of the tool. Manual release of either of the levers will inactivate the tool.

A further feature is that the usual control of air volume to the motor is maintained, in that one of the pair of valves serves the function of the usual throttle valve.

In accordance with the invention, there is provided in the handle of a pneumatically powered hand held tool, a chamber having an inlet connectible to a live air source and having an outlet connectible to an air motor or the tool, a first valve means controlling flow of source air through the inlet to the chamber, a first spring means normally biasing the first valve means closed over the inlet, a first manipulative means projecting under bias of the first spring means externally of the handle for actuating the first valve means to open condition against the bias of the first spring means; a second valve means controlling flow from the chamber through the outlet of source air admitted through the first valve means to the chamber, a second spring means normally biasing the second valve means closed over the outlet, and a second manipulative means projecting under bias of the second spring means externally of the handle for actuating the second valve means to open condition against the bias of the second spring means.

DESCRIPTION OF THE PREFERRED EMBODIMENT

Figures 1, 2:
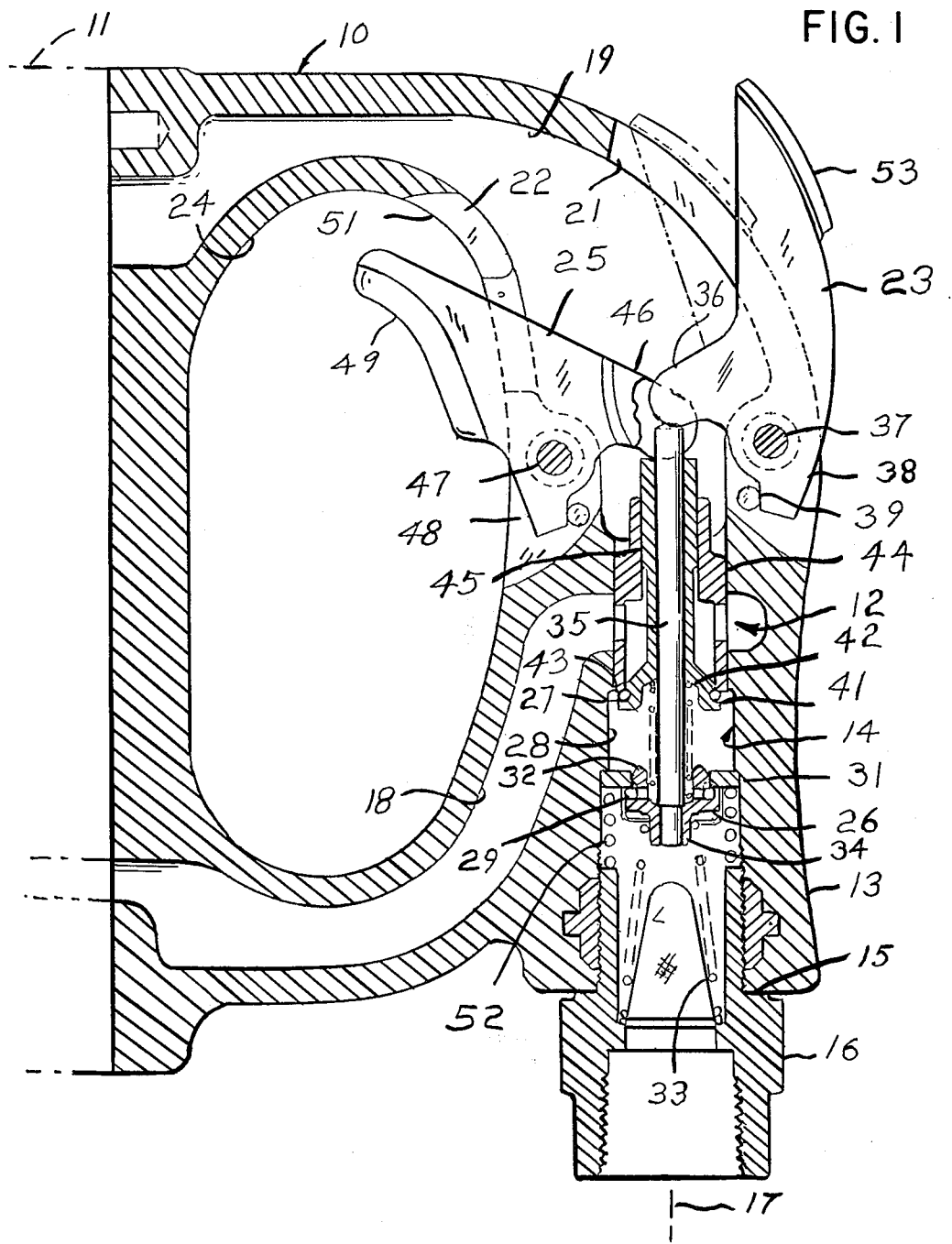
FIG. 1 is a sectional view of the handle of an air operated portable tool illustrating an embodiment of the invention.
FIG. 2 is a fragmentary detail view showing the interrelation of the throttle lever with the trigger lever.

Reference is now directed to the several FIGURES of the drawing wherein is shown the handle 10 of a conventional air powered tool, in this case a pneumatic wrench. The handle is bolted in usual manner to the back end of the housing or body 11 of the tool.

The conventional impact wrench includes an air driven rotary motor (not shown) which is drivingly connected to impacting mechanism. The latter carries an external socket engageable with a fastener, such as a bolt or nut, intended to be driven into a work object. When the motor is pneumatically activated, it transmits torque to the impacting mechanism which initially operates to set the fastener to an initial degree of tightness and then operates to set the fastener by means of a series of impacts to a final degree of tightness.

Flow of feeding of pressurized inlet air to operate the motor is controlled, in accordance with the present invention, by means of a manually operable valve structure or mechanism 12 incorporated in a rear section 13 of the handle. The valve mechanism is fitted in a bore, generally designated 14, which opens at its lower end through the bottom wall of the handle to define an air supply port 15.

Threadedly engaged in port 15 is an adapter end 16 of an air supply hose line 17 connected to a source of live air. Bore 14 connects intermediately of its ends with a passage 18 which leads through the handle to the motor chamber of the tool.

The upper end of bore 14 opens into a relatively enlarged hollow handle area or chamber 19. A slot 21 opening through the back section of the handle into the area 19 is provided to slidably accommodate a throttle valve lever 23. An oppositely disposed slot 22 opening from chamber 19 into a cut-away or cross hand-hole 24 of the handle is provided to slidably accommodate a safety valve lever or trigger 25.

The valve mechanism 12 includes a primary or throttle valve 26 which is operable by means of the throttle lever 23; and includes a secondary or safety valve 27 which is operable by means of the trigger 25. Both the throttle valve and the safety valve must be held currently operated in order to provide operating air feed to the motor.

The handle is of conventional configuration or form. Its back section 13 is adapted to be held in the palm of the hand; and its enlarged hand opening 24 is adapted to receive four fingers of the operator's hand. When the tool is manually held, the operator's thumb would be used to operate the throttle lever which is outside of the handle; and his forefinger would be used to operate the trigger which is inside of the handle.

The throttle and safety valves are arranged in the bore in axial alignment with each other, the throttle valve being spaced below the safety valve. The space between the two values defines a chamber 28 having an inlet at one end controlled by the throttle valve and having an outlet at the opposite end controlled by the safety valve.

The throttle valve has an annular body between the ends of which is mounted an O-ring 29 that is adapted to engage with a valve seat 31 about the inlet end of chamber 28. An upper hub end 32 of the valve has a slidable relation to the opening in the valve seat as a means of guiding the valve in its seating action. A return compression spring 33 disposed between an internal shoulder of the supply adapter 16 and the underside of the throttle valve biases the latter to its seat. A depending central boss 34 of the valve serves to center the spring relative to the valve.

The throttle valve has an axially extending stem 35, the upper end of which abuts an overlying rounded nose 36 of the throttle lever. The throttle lever is pivotally supported upon a pin 37 mounted in the handle. It has a normal "at rest" position in which a depending ear 38 abuts against a stop pin 39 fixed in the housing, the stop pin serving to limit the extent of outward pivoting of the throttle lever relative to the handle.

In this normal position, the nose portion 36 of the throttle lever abuts the throttle valve stem, and when the throttle lever is pressed about its pivot inwardly against the stem, the throttle valve is moved to open condition against the opposed force of spring 33.

Unseating of the throttle valve allows inlet air to flow through the valve seat into chamber 28 above the throttle valve; but flow from the latter chamber to the passage 18 leading to the motor is normally blocked by the seated condition of the safety valve.

The safety valve 27 has an enlarged annular end or head 41 provided with an O-ring which is normally held under the bias of a compression spring 42 closed upon an overhead valve seat 43 about the outlet end of chamber 28. The seat is defined by the bottom end shoulder of a bushing 44 fitted in the upper end of bore 14. The compression spring 42 abuts at one end upon a recessed shoulder of the throttle valve and abuts at its opposite end upon a recessed shoulder of the safety valve. The safety valve is provided with an axially extending stem 45 which extends slidably out of the upper end of the bushing into abutment with an overlying rounded tail 46 of the trigger lever 25.

The trigger lever is pivotally supported upon a pin 47 mounted in the handle. It has a normal "at rest" condition in which a depending ear 48 abuts a stop pin fixed in the handle, and in which position a finger-press portion 49 extends into the hand opening 24. The stop pin serves to limit the extent of outward movement of the trigger relative to the handle into the hand opening. In this normal position, the tail 46 of the trigger abuts the rear end of the stem 45 of the safety valve.

The tail 46 of the trigger 25 is bifurcated (as best seen in FIG. 2). The stem 35 of the throttle valve extends slidably through the stem 45 of the safety valve and protrudes from the latter slidably between the arms of the bifurcation. The nose 36 of the throttle lever is movable relative to the trigger into the bifurcation to actuate the stem of the throttle valve.

In the normal position of the trigger, its tail abuts the rear end of the safety valve stem and when the trigger is pressed about its pivot inwardly of the handle, the safety valve is unseated against the force of its return spring to communicate chamber 28 above the throttle valve with the passage 18 leading to the motor.

The finger-press portion 49 of the trigger extends laterally beyond the body or opposite faces of the trigger and beyond the lateral dimension of the trigger slot so that it will cooperate with the inside wall 51 of the handle to limit the extent to which the trigger may be moved in unseating the safety valve. The throttle lever has a similar thumb-press portion 53.

From the foregoing description, it is apparent that both the safety valve and the throttle valve must be in open condition to allow operating air flow to the motor. It is also apparent that the throttle lever and safety trigger are operable independently of one another; and that both must be manually held in operated condition to maintain both valves open against the closing forces of their return springs. It is also apparent that if one of the other of the valves is caused to be closed, supply air will be shut off from, and cannot flow to, the motor.

In the use of the tool, the throttle valve is controlling air volume to the motor will preferably be manipulated as needed in restricting or increasing the air volume; and the safety valve will be merely maintained in operated condition. When starting operation of the tool, it is preferable to actuate the safety valve before actuating the throttle valve. By following this sequence, the underside of the safety valve will not be charged with air requiring added effort of the operator on the trigger to activate the safety valve to open condition, as would be the case were the throttle valve operated first.

It is further to be noted that the safety trigger is located in the hand hold 24 where it is protectively guarded against accidental operation to a reasonable degree by the surrounding wall area 51 defining the hand hole.

The structure of the bore 14 and the particular organized axial and coaxial disposition of the components of both valves within the bore provide additional advantages. It is to be noted that the bore is linear in its extension within the handle relative to the supply port 15. It is also to be noted that the throttle valve seat 31 floats upon a spring 52 which limits upon an internal shoulder of the supply adapter 16. The spring holds seat 31 in pressed position relative to a shoulder of the bore. The supply connected portion of the bore is of greater diameter than the chamber portion 28 of the bore; and the latter is of greater diameter than the upper or bushing accommodated portion of the bore. This desirable linear counterbored structure of the bore and the axial disposition of the valve elements therein enable the valve elements to be readily retracted for replacement or otherwise out of the bore following removal of the adapter 16.

We claim:

1. In the handle of a pneumatically powererd hand held tool, a chamber having an inlet at one end connected with an air supply passage and at its opposite end having an outlet, the outlet being connected with an outlet passage that is connectible with an air motor of the tool; a first valve means controlling flow of supply air through the inlet to the chamber, a first spring means in the supply passage normally biasing the first valve means closed over the inlet, a first manipulative means projecting under bias of the first spring means externally of the handle arranged for actuating the first valve means to open condition against the bias of the first spring means, a second valve means arranged coaxial with the first valve means controlling flow from the chamber through the outlet of supply air admitted through the first valve means to the chamber, a second spring means located in the chamber normally biasing the second valve means closed over the outlet, a second manipulative means projecting under bias of the second spring means externally of the handle in opposed relation to the first manipulative means arranged for actuating the second valve means to open condition against the bias of the second spring means, each manipulative means being manually actuable independently of the other to move its related valve means to open condition without affecting the closed condition of the other valve means, and both manipulative means being arranged in the handle so as to be both encompassed by a single operating hand of the operator as it grips the handle.

2. In the handle of a pneumatically powered hand held tool as in claim 1, wherein the inlet and outlet are axially aligned and the second valve means is spaced axially from the first valve means.

3. In the handle of a pneumatically powered hand held tool as in claim 1, wherein the first and second manipulative means are located in opposed portions of the handle.

4. In the handle of a pneumatically powered hand held tool as in claim 3, wherein the handle is adapted to be grasped in the palm of a hand and each manipulative means is subject to being selectively actuated by a separate digit of the hand while the handle is in the grasp of the hand.

5. In the handle of a pneumatically powered hand held tool as in claim 2, wherein the first valve means comprises a valve, a seat about the inlet engageable by the valve under the bias of the first spring means, and a stem extending axially from the valve through the chamber into abutment with the first manipulative means.

6. In the handle of a pneumatically powered hand held tool as in claim 5, wherein the first manipulative means is a throttle lever.

7. In the handle of a pneumatically powered hand held tool as in claim 6, wherein the throttle lever projects externally of the tool through a back wall of the handle.

8. In the handle of a pneumatically powered hand held tool as in claim 2, wherein the second valve means comprises a valve, a seat about the outlet engageable by the valve under the bias of the second spring means, and a stem extending axially from the valve into abutment with the second manipulative means.

9. In the handle of a pneumatically powered hand held tool as in claim 8, wherein the second manipulative means is a trigger.

10. In the handle of a pneumatically powered hand held tool as in claim 9, wherein the trigger projects externally through an inside wall of the handle.

11. In the handle of a pneumatically powered hand held tool as in claim 1, wherein the inlet and outlet are disposed in spaced axial alignment to each other, the first manipulative means is a throttle lever projecting externally of the tool through a back wall of the handle, the second manipulative means is a trigger projecting externally of the tool through an opposite inside wall of the handle; and the first valve means comprises a valve, a seat about the inlet engageable by the valve under the bias of the first spring means, and a stem extending axially from the valve through the chamber into abutment with an inner end of the throttle lever.

12. In the handle of a pneumatically powered hand held tool as in claim 11, wherein the second valve means comprises a valve, a seat about the outlet engageable by the latter valve under the bias of the second spring means, and a hollow stem extending axially from the said latter valve in sleeved relation to the stem of the first valve into abutment with an inner end of the trigger.

13. In the handle of a pneumatically powered hand held tool as in claim 12, wherein the stem of the first valve protrudes out of a rear end of the hollow stem, the inner end of the trigger is bifurcated the arms of which extend about the protruding stem of the first valve and abut upon a rear end of the hollow stem, and the inner end of the throttle lever depends into the bifurcation into abutment with the rear end of the stem fo the first valve.

14. In the handle of a pneumatically powered hand held tool as in claim 13, wherein a counterbore is located in the handle between the chamber and an air supply port to the handle, and an adapter connectible to an air supply line is fitted in the supply port.

15. In the handle of a pneumatically powered hand held tool, a chamber having an inlet connectible to a live air source and having an outlet connectible to an air motor of the tool; a first valve means controlling flow of source air through the inlet to the chamber, a first spring means normally biasing the first valve means closed over the inlet, a first manipulative means projecting under bias of the first spring means externally of the handle for actuating the first valve means to open condition against the bias of the first spring means; a second valve means controlling flow from the chamber through the outlet of source air admitted through the first valve means to the chamber, a second spring means normally biasing the second valve means closed over the outlet, and a second manipulative means projecting under bias of the second spring means externally of the handle for actuating the second valve means to open condition against the bias of the second spring means, wherein the inlet and outlet are disposed in spaced axial alignment to each other, the first manipulative means is a throttle lever projecting externally of the tool through a back wall of the handle, the second manipulative means is a trigger projecting externally of the tool through an opposite inside wall of the handle; and the first valve means comprises a valve, a seat about the inlet engageable by the valve under the bias of the first spring means, and a stem extending axially from the valve through the chamber into abutment with an inner end of the throttle lever; wherein the second valve means comprises a valve, a seat about the outlet engageable by the latter valve under the bias of the second spring means, and a hollow stem extending axially from the said latter valve in sleeved relation to the stem fo the first valve into abutment with an inner end of the trigger; wherein the stem of the first valve protrudes out of a rear end of the hollow stem, the inner end of the trigger is bifurcated the arms of which extend about the protruding stem of the first valve and abut upon a rear end of the hollow stem, and the inner end of the throttle lever depends into the bifurcation into abutment with the rear end of the stem of the first valve; wherein a counterbore is located in the handle between the chamber and an air supply port to the handle, and an adapter connectible to an air supply line is fitted in the supply port; and wherein the chamber defines a shoulder about the inlet, the first valve seat is a separable element engageable with the shoulder, and a spring disposed in the counterbore biases the seat upon the shoulder.

16. In the handle of a pneumatically powered hand held tool as in claim 15, wherein the chamber and counterbore are axially aligned, and the elements of the first and second valve means are extractible from the chamber and counterbore through the supply port following removal of the adapter.

17. In the handle of a pneumatically powered hand held tool, a chamber having an inlet at one end connectible to a live air source, and having an outlet at its opposite end connectible to an air motor of the tool; a first valve means controlling flow of source air through the inlet to the chamber comprising a first valve, a seat about the inlet engageable by the valve, a stem extending axially from the valve through the chamber, a spring in a passage below the seat biasing the valve closed upon the seat, and a manually depressible first lever for actuating the valve to open condition against the bias of the spring, the lever projecting externally of the handle and having an inner end abutting a rear end of the stem of the valve; and a second valve means controlling flow from the chamber through the outlet to the motor of source air admitted through the first valve means to the chamber, the second valve means comprising a second valve, a seat about the outlet engageable by the second valve, a hollow stem extending axially from the second valve in sleeved relation to the stem of the first valve, spring means in the chamber biasing the second valve closed upon its seat, and a manually depressible second lever for actuating the second valve to open condition, the second lever projecting externally of the handle and having an inner end abutting a rear end of the hollow stem of the second valve, and each lever being manually actuable independently of the other to move its related valve to open condition without affecting the closed condition of the other valve.

18. In the handle of a pneumatically powered hand held tool as in claim 17, wherein the second lever has a forked inner end abutting the rear end of the hollow stem of the second valve, into which forked end a rear end of the stem of the first valve partially protrudes and the inner end of the first lever depends.

19. In the handle of a pneumatically powered hand held tool as in claim 18, wherein the first lever projects from an outside back wall of the handle, and the second lever projects from an opposed inside forward wall of the handle.

20. In the handle of a pneumatically powered hand held tool as in claim 19, wherein the handle is adapted to be grasped in the palm of the operator's hand and the first lever is positioned in the handle relative to the operator's thumb while the handle is grasped by the operator and the second lever is positioned in the handle relative to the operator's forefinger.

* * * * *